(No Model.)
J. W. BRAGGER.
INJECTOR FOR GAS SERVICE PIPES.
No. 581,477. Patented Apr. 27, 1897.
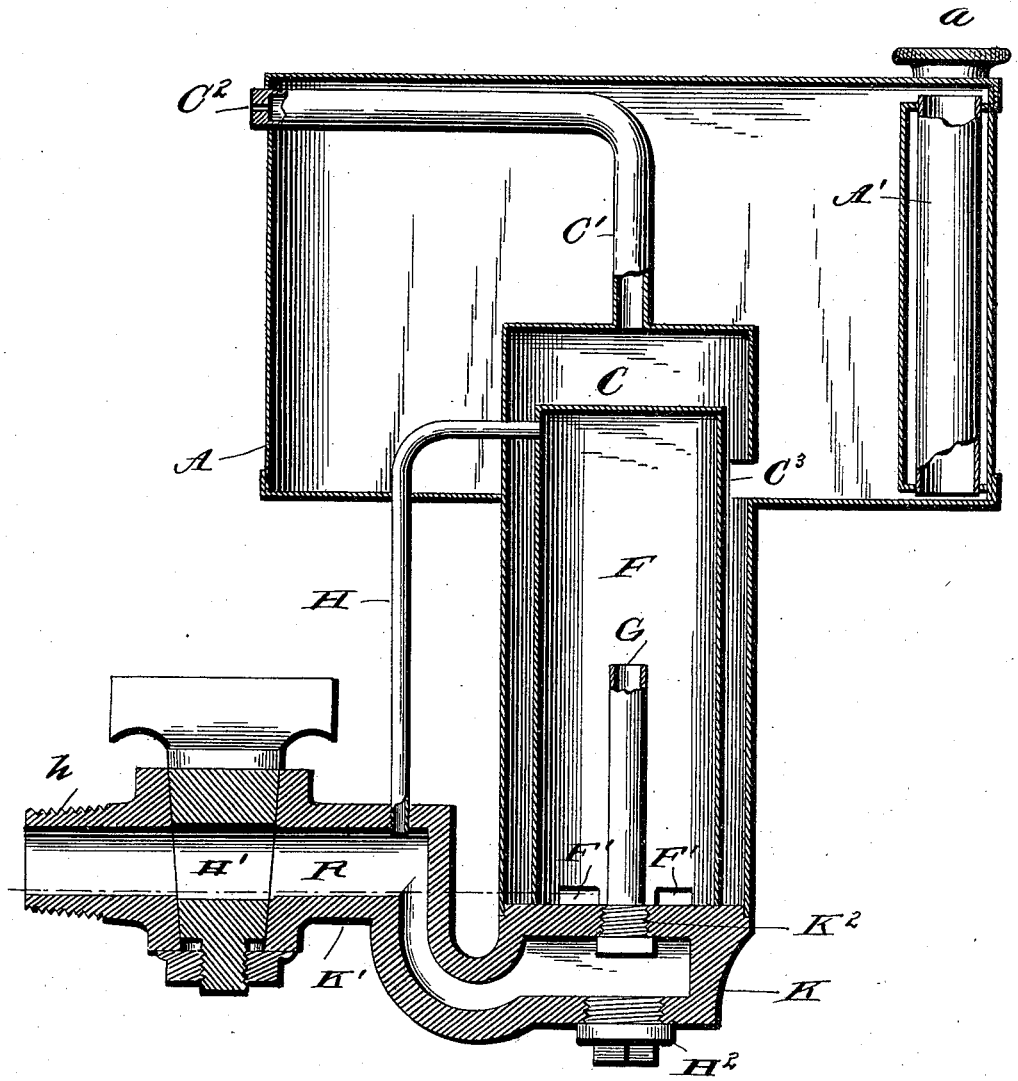

UNITED STATES PATENT OFFICE.

JOHN W. BRAGGER, OF WATERTOWN, NEW YORK, ASSIGNOR TO THE HITCHCOCK LAMP COMPANY, OF SAME PLACE.

INJECTOR FOR GAS SERVICE-PIPES.

SPECIFICATION forming part of Letters Patent No. 581,477, dated April 27, 1897.

Application filed November 17, 1896. Serial No. 612,474. (No model.)

*To all whom it may concern:*

Be it known that I, JOHN W. BRAGGER, a citizen of the United States, residing at Watertown, in the county of Jefferson and State of New York, have invented certain new and useful Improvements in Injectors for Gas Service-Pipes; and I do declare the following to be a full, clear, and exact description of the invention, such as will enable others skilled in the art to which it appertains to make and use the same, reference being had to the accompanying drawing, and to the letters of reference marked thereon, which forms a part of this specification.

This invention relates to certain new and useful improvements in injectors; and it is the aim of the present invention to generally improve upon and simplify the construction of injector upon which I was granted Letters Patent numbered 466,998, dated January 12, 1892.

My invention is designed for use in connection with service-pipes by the use of which alcohol or other liquids may be injected into the pipes to remove frost, naphthalene, &c., which is apt to collect in gas-pipes as a result of cold weather.

To these ends and to such others as the invention may pertain the same consists, further, in the novel construction, combination, and adaptation of the parts, as will be hereinafter more fully described and then specifically defined in the appended claims.

The invention is clearly illustrated in the accompanying drawing, which, with the letters of reference marked thereon, forms a part of this specification, and in which drawing the figure is a central vertical sectional view of the injector, showing the pipe connections, compartments, and outlet, which is designed to be connected with the gas-pipe into which the alcohol is to be injected.

Reference now being had to the details of the drawing by letter, A designates a suitable air and water tight compartment or chamber which is provided with a suitable filling-aperture $a$. The said chamber A is provided with a suitable gage-pipe A'.

C is a chamber or cylinder extending into the chamber A and has communication with the latter through the aperture $C^3$.

C' is a pipe leading from the chamber C up through the chamber A, and bent at an angle near its upper end is outwardly turned, communicating with the outside atmosphere through the vent $C^2$.

The cylindrical compartment C is mounted on the base K. Within the chamber C is the chamber F, closed at its upper end and having communication with the chamber C through apertures F' at the bottom thereof. Near the upper end of the chamber F leads off the pipe H, the other end of which pipe is connected to and communicates with the trap extension K'.

H' is a stop-cock by which communication may be had from the injector to the gas service-pipe, which is connected at the screw-threaded portion $h$.

Fitted in a screw-threaded aperture $K^2$ in the base portion K is a tube G, which is open at its upper end and which tube may be raised or lowered by its screw-threaded connections. Immediately beneath the lower end of the said tube is the screw-threaded plug $H^2$, fitted into a screw-threaded aperture, and by the removal of which plug access may be had to the tube G when it is desired to remove the same or to regulate its height for stated pressures.

If desirable, different lengths of tubing may be used, each pipe having the same size of threaded portion to fit the aperture provided to receive the same.

R is a trap passage-way formed in the base portion and extends laterally from one side of the injector, and when the said trap is filled with liquid no direct gas-pressure is allowed to enter the bottom of the chamber F, as the pressure enters chamber F through the pipe H.

By the provision of the trap described, which is constantly filled with liquid, a supply of the liquid will pass by capillary attraction from the outer portion of the trap up the inner wall of the passage-way leading to the pressure-pipe H and, entering same, keep it clear of naphthalene at all times, while at the opposite end of the trap alcohol or other liquid will work up into the pipe G in the same way and keep it clear of obstruction, which is of importance to render the injector operative at all times.

When the injector is arranged to adapt it for use for a high pressure and a short tube G is inserted in the aperture provided to receive same, when the upper end of the said tube G is but a slight distance above the upper margin of the apertures $F'$ it is preferable to have the lower level of the outlet-passage either on a level with the upper margin of the apertures $F'$ or slightly below.

In operation the chamber A is filled with alcohol or other liquid, which flows through the aperture $C^3$ into chamber C and passes through the apertures $F'$ into the chamber F, and will rise in this latter chamber to such a height as it will be allowed by the pressure of gas or air contained in the upper portion thereof. The gas-pressure from the pipe leads into the upper end of the chamber F through pipe H, and the air which is displaced in the chamber C by the alcohol or other liquid being poured therein escapes through the passage-way $C'$ and outside of the chamber. After the alcohol or other liquid has risen in the chamber F as far as the pressure of gas will allow it will rise in the chambers C and A, and also in pipe $C'$, until it finds its level with that contained within the chamber A; but when the feeder-cap $a$ is closed and cock $H'$ is opened the alcohol or other liquid in chamber C and pipe $C'$ will settle down in chamber C until it stands a trifle above the opening $C^3$, which is its normal position when the normal pressure of gas is on. The pressure of gas from the service-pipe is allowed to enter the chamber F through pipe H, and serves to force the alcohol or other liquid within said chamber down and out through the apertures $F'$ into the chamber C, forcing the air in the upper part of the latter chamber out through the vent $C^2$, and the injector now stands with normal pressure upon it. When frost or naphthalene has formed within the gas-pipe, the pressure within the pipe between the point at which the obstruction exists and the point at which the injector is applied is somewhat reduced, which will allow the alcohol within the chamber F to rise, and when the pressure has been sufficiently reduced the alcohol will rise within the chamber to above the top of overflow-pipe G (which pipe may be replaced with one of a different length if it is desired to adapt the injector to work at different pressures) and flow into the trap and from thence into the service-pipe, no gas being allowed to enter the chamber F through the pipe G, owing to the trap being filled constantly with alcohol. When sufficient alcohol has passed into the service-pipe to cure the naphthalene or frost, the pressure within the pipe will be raised to its normal point and, passing through the pipe H, will serve to force the alcohol or other liquid within the chamber F down, causing it to rise in the chamber C above the aperture $C^3$. As the pressure of gases which come from the service-pipe is reduced in the upper end of chamber F, the liquid will lower in chamber C, and when it reaches a height below the opening $C^3$ the supply of liquid from chamber A will run into chamber C until it rises above the upper margin of aperture $C^3$, as will be readily understood.

Having thus described my invention, what I claim to be new, and desire to secure by Letters Patent is—

1. An injector for gas service-pipes having in combination with the chambers of the injector, a trap having communication with the service-pipe and the chambers, substantially as shown and described.

2. In an injector for gas service-pipes, the combination with the chambers A, C, and F as described, of the laterally-extending trap on which the chambers are supported, the discharge-pipe G and a pressure-pipe H communicating between the passage-way connected to the trap and the upper end of the chamber F, substantially as shown and described.

3. In an injector for gas service-pipes, the combination with the chambers A, C, and F, the base on which the said chambers are supported, forming a trap, of a removable discharge-pipe G leading into the inner chamber, F, and the pressure-pipe H leading from above the trap to the upper end of the chamber F, substantially as shown and described.

4. In an injector for gas service-pipes, the combination with the chambers A, C and F, communicating through the aperture $C^3$ and $F'$, of the base portion having formed therein a trap, a horizontally-extended portion of said base portion carrying a stop-cock, the bottom of the inside of which extension is in a plane below the upper margin of the apertures $F'$ at the bottom of chamber F, substantially as shown and for the purpose set forth.

In testimony whereof I affix my signature in presence of two witnesses.

JOHN W. BRAGGER.

Witnesses:
JNO. B. TAYLOR,
CORA L. SHERMAN.